ated Apr. 13, 1971

3,574,820
MEDICINAL DOSAGE FORMS OF UNPOLYMERIZED THIOLATED GELATIN WITH A CROSSLINKING ACCELERATING AGENT PROVIDING SLOWLY RELEASED MEDICATION FROM A SWOLLEN MATRIX
Richard H. Johnson and Englebert L. Rowe, Kalamazoo, Mich., assignors to The Upjohn Company, Kalamazoo, Mich.
No Drawing. Continuation of application Ser. No. 302,741, Aug. 16, 1963. This application Jan. 8, 1968, Ser. No. 696,102
Int. Cl. A61k 27/12
U.S. Cl. 424—22          4 Claims

ABSTRACT OF THE DISCLOSURE

A dry solid medicinal dosage form comprising a medicinal agent, the reaction product of gelatin with N-acetylhomocysteine thiolactone having an average molecular weight of from 10,000 to 500,000 and having an average of from about 3.5 to about 30—SH equivalents per 100,000 grams and accelerating agent (hardening or sulfydryl cross-linking agent which can be a pharmacologically acceptable oxidizing agent or base) and one or both of a non-digestible hydrophilic colloid and a water soluble mineral acid salt. The dosage form containing the reaction product of gelatin with N-acetylhomocysteine thiolactone in the unpolymerized form, i.e., the product is not cross-linked and contains free sulfhydrol groups.

CROSS REFERENCES TO RELATED APPLICATIONS

This application is a continuation of application Ser. No. 302,741, filed Aug. 16, 1963, now abandoned.

Copending application Ser. No. 553,706, filed May 25, 1966, now abandoned describes the preparation of dry solid medicinal dosage forms comprising thiolated gelatin, accelerating agents and a medicinal agent.

BRIEF SUMMARY OF INVENTION

This invention relates to improvements in medicinal dosage forms and more particularly to improved dosage forms comprising a medicinal ingredient and a carrier of thiolated gelatin and accelerating agent, said improvements consisting of the addition of one or both of a hydrophilic colloid and a water soluble salt having a cation selected from the group consisting of alkali metal and ammonium.

DETAILED DESCRIPTION

As used in the specification, the term thiolated gelatin means the reaction product of gelatin with N-acetylhomocysteine thiolactone having an average molecular weight of from 10,000 to 500,000 and having an average of from about 3.5 to about 30—SH equivalents per 100,000 grams. The term means the uncross-linked (unpolymerized) product which contains free sulfhydrol (—SH) groups.

Copending application Ser. No. 553,706, filed May 25, 1966 describes the preparation of dry solid medicinal dosage forms comprising thiolated gelatin, a pharmacologically acceptable accelerating agent and a medicinal agent. These dry solid medicinal dosage forms have the unique action of remaining in the stomach and thereby advantageously releasing the medicinal agent in solution at the absorption site over a long period of time. It is believed that the mechanism whereby the unique effect is obtained is that upon reaching the stomach the thiolated gelatin of the dosage form hydrates, swells, gels, and cross links, although not necessarily in that order, to form a matrix too large to pass through the pylorus.

Another application of this dosage form is with medicinal agents which are absorbed primarily in the upper small intestine (e.g., weak bases with a pKa equal to or less than 7.8). This class of medicinal, weak bases, when administered by the conventional dosage forms of the prior art, e.g., capsule, tablet, or solution, are emptied directly from the stomach into the intestine and much of the dose, due to the rapid rate of transit, passes through the intestine before there is sufficient time for substantial absorption. The incorporation of these medicinals in a thiolated gelatin carrier provides for a greater total therapeutic activity for a given dose due to the unique action by the dosage form of remaining in the stomach and releasing the medicinal in solution in small dosage increments. Similarly, the phenomenon of release in small dosage increments presents an advantageous method for administering medicinals which are irritating or otherwise toxic when administered in dosage forms which make the drug rapidly available.

The present invention comprises improvements in the compositions of the aforementioned copending application, said improvements consisting of the addition to the tablet formulation of at least one non-digestible hydrophilic colloid and a water soluble salt of a mineral acid and having a cation selected from the group consisting of alkali metal and ammonium ions.

The presence of the water soluble salt in the tablet formulation hastens the rate of hydration of the tablet whereby the tablet swells faster. The presence of the added colloidal material in the tablet formulation causes the tablet to swell to a larger size and the tablet remains substantially larger over a longer period of time. Together the two additions provide an improved tablet having more desirable release characteristics.

Although the dry solid medicinal dosage forms of the present invention find their primary application in the oral route of administration it is also possible to prepare dry solid medicinal dosage forms for implantation, that is, subcutaneous implantation of pellets, which have a similar effect of slow continual release of medicinal ingredient. Similarly, it is possible to prepare the dosage forms in the form of a suppository for rectal or vaginal application. In both of the preceding applications the dosage form swells to provide a pliable matrix which releases the medication in solution.

The term dry solid medicinal dosage form as used in the specification and claims refers to physically discrete units suitable as unitary dosages for human subjects and animals, each unit containing a predetermined quantity of medicinal material calculated to produce the desired therapeutic effect in association with thiolated gelatin, an accelerator and optionally with compounding diluents and adjuvants known to the art. The specifications for the novel dry solid medicinal dosage forms of this invention are dictated by and directly dependent on (a) the characteristics of the various ingredients and the particular therapeutic effect to be achieved, and (b) the limitations inherent in the art of compounding such ingredients used in humans and animals, as disclosed in detail in this specification, these being features of the present invention. Examples of suitable unit dosage forms in accord with this invention are tablets, capsules, troches, suppositories, pellets, wafers, and pre-measured amounts of granules.

The term "dry" is used in the pharmaceutical sense and refers to the gross appearance of the dosage forms and not in the chemical sense which means the total absence of water. It is to be anticipated that many of the dosage forms will contain an ingredient that carries with it a certain amount of water of crystallization and it is also to be expected that the humidity of the compounding environment will contribute some moisture (water) to the finished dosage form.

The thiolated gelatin can be prepared by reacting a thiolactone, e.g., N-acetylhomocysteine thiolactone, with gelatin whereby free sulfhydryl groups (—SH) are attached through peptide bonds to the gelatin. The preparation can be accomplished in accordance with the method of Benesch and Benesch: Proc. of Natl. Acad. Sci. U.S., 55 (9), 848–853, September 1958.

The thiolated gelatin can comprise from about 5 to about 90% w./w. of the dry solid medicinal dosage forms.

The second ingredient in the compositions of the present invention is an accelerating agent. The accelerating agent can also be called a hardening agent or a cross-linking agent in view of the end characteristics of the thiolated gelatin as a result of the action of the agent. The accelerating agent can be any compound which has the effect of increasing the rate of the cross-linking of the thiol groups of the thiolated gelatin.

Suitable accelerating agents are pharmacologically acceptable oxidizing agents, e.g., potassium iodate, cupric sulfate, ferric ammonium sulfate, dehydroascorbic acid, and iodosobenzoic acid; and bases, e.g., tribasic sodium phosphate and dibasic calcium phosphate. Suitable oxidizing agents are those compounds having a standard oxidation-reduction potential (E° value volts) more negative than —0.05 volt in acid solutions for the oxidation reaction:

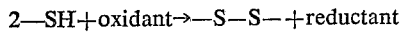

Suitable bases are those compounds having buffering capacity toward hydrogen ions in a system having a pH range of from 1 to 8. The accelerating agent can comprise both an oxidizing agent and a base.

The amount of accelerating agent used can be from about 0.1 to about 20% w./w. of the dosage form.

The medicinal ingredient can be any therapeutic agent which is suitably administered orally or by pellet implant (parenterally) as well as agents usefully administered by suppository. Antibiotics, anti-cholinergics, tranquilizers, sedatives, steroids, antihistamines, vitamins, hematinics, anorexigenics and analgesics are advantageously administered by means of the dosage forms of the instant invention.

Medicinal agents for which the dosage forms of the present invention are particularly advantageous as a means for administration are those which are weak acids with a pKa equal to or greater than 3 as well as most weak bases with a pKa equal to or less than 7.8, all antibiotics and quaternary ammonium compounds.

The first ingredient, whose addition results in an improved tablet is a non-digestible hydrophilic colloid. As used in the specification and claims the term "non-digestible" means less than 1% digestible in 4 hours under conditions of exposure to an aqueous solution of 0.05 N hydrochloric acid adjusted to ionic strength of 0.1 with sodium chloride and containing 0.32% w./v. of pepsin (the solution being substantially artificial gastric juice) at a temperature of 37.5° C. Suitable non-digestible hydrophilic colloids are, for example: naturally occurring gums and polysaccharides such as sodium alginate, alginic acid, carrageenin, guar gum, tragacanth, pectin, pectic acid, karaya gum, and locust bean gum; clays, such as bentonite and attapulgite; synthetic polymers such as styrene-maleic acid copolymer, polyvinylpyrrolidone, irradiated polyoxymethylene, polyvinyl methyl ether maleic anhydride and carboxypolymethylene; and cellulose and derivatives thereof such as cellulose acetate phthalate, methylcellulose, hydroxypropylmethylcellulose, carboxymethylcellulose, oxidized cellulose and purified cellulose. Mixtures of two or more colloids can be used, for example, sodium alginate and carboxypolymethylene are a preferred combination. The non-digestible hydrophilic colloid can be up to about 90% w./w. of the dosage form with a preferred range of about 5% to about 70%.

The second ingredient whose addition results in an improved tablet is a pharmacologically acceptable water soluble salt of a mineral acid having a cation selected from the group consisting of alkali metal and ammonium ions. Suitable salts are, for example, the chlorides, nitrates, iodides, sulfates, carbonates and bicarbonates of sodium, potassium and ammonia. Sodium chloride is preferred. The salt is present in a concentration of from about 8 to about 60% w./w. of the dosage form. It is also preferred that the salt be of a fineness to pass a 20 to 200 mesh screen.

In addition to the aforementioned ingredients, the dry solid medicinal dosage forms can contain the various compounding adjuvants known to the art. For example, in preparing tablets, diluents such as starch and lactose can be added to increase the bulk of the dosage form. Lubricants such as magnesium stearate and stearic acid can be added to facilitate the tableting operation. Other ingredients such as colorants, stabilizers, dyes and antioxidants can be added as in normal tableting practice.

The release rate of the medicinal agent is also influenced by the presence of hydrophilic and lipophilic materials as well as surfactants. In general a lipophilic substance, e.g., stearic acid, slows the release rate and surfactants, e.g., these having a high HLB number (10–18) increase the release rate of the medicinal agent.

The dry solid medicinal dosage form of the present invention is prepared in the usual manner known to the art. For example, tablets can be prepared by mixing the dry powders together, granulating, and compressing on a tablet machine. A slugging or direct compression process can be used as an alternative to granulating. The tablets can be of the usual shape or compressed in conical shape for use as a suppository.

Capsules are prepared by preparing a dry powder mixture and filling into preformed hard or soft gelatin sheaths or capsules.

The following examples illustrate the best mode contemplated by the inventors for carrying out the invention but are not to be construed as limiting the scope thereof.

EXAMPLE 1

5000 tablets are prepared from the following types and amounts of ingredients:

| | Gm. |
|---|---|
| Thiolated gelatin (12–13—SH/10⁵ gm.) | 500.0 |
| Cupric sulfate | 7.5 |
| Sodium alginate | 750.0 |
| Carboxypolymethylene | 325.0 |
| Tetracycline hydrochloride | 1375.0 |
| Sodium chloride | 500.0 |
| Magnesium stearate | 40.0 |

The ingredients are mixed together and pressed into tablets. The tablets so prepared when swallowed orally, wet and swell rapidly in the stomach, remain in the stomach, and release tetracycline to the gastric fluids for a sustained period of time.

EXAMPLE 2

One thousand tablets are prepared from the following types and amounts of ingredients:

| | Gm. |
|---|---|
| Thiolated gelatin (12–13—SH/10⁵ gm.) | 300 |
| Tribasic sodium phosphate (Na₃PO₄·12H₂O) | 10 |
| Cupric sulfate, anhydrous | 4 |
| Tetracycline hydrochloride | 250 |
| Sodium chloride | 100 |

The ingredients are mixed together and compressed into tablets in the usual manner.

EXAMPLE 3

One thousand tablets are prepared from the following types and amounts of ingredients:

| | Gm. |
|---|---|
| Thiolated gelatin (12–13—SH/$10^5$ gm.) | 100 |
| Tribasic sodium phosphate | 10 |
| Cupric sulfate, anhydrous | 1.5 |
| Tetracycline hydrochloride | 250 |
| Magnesium stearate | 5 |
| Sodium chloride | 75 |
| Carrageenin | 100 |
| Karaya gum | 50 |

The ingredients are mixed together and compressed into tablets in the usual manner.

EXAMPLE 4

One thousand tablets are prepared from the following types and amounts of ingredients:

| | Gm. |
|---|---|
| Thiolated gelatin (12–13—SH/$10^5$ gm.) | 250 |
| Starch | 50 |
| Ferric ammonium sulfate | 14 |
| Tetracycline hydrochloride | 125 |
| Attapulgite | 200 |

The ingredients are mixed together and compressed into tablets in the usual manner.

Following the procedure of the preceding Examples 1 to 4, inclusive, tablets are similarly prepared substituting oxytetracycline, chlortetracycline, chlortmphenicol, fumagillin, lincomycin, peniciliin, streptomycin and novobiocin for the tetracycline of the example.

EXAMPLE 5

One thousand tablets are prepared from the following types and amounts of ingredients:

| | Gm. |
|---|---|
| Thiolated gelatin (12–13—SH/$10^5$ gm.) | 50 |
| Tribasic sodium phosphate | 10 |
| Cupric sulfate, anhydrous | 0.5 |
| 6α-methylprednisolone | 2 |
| Potassium nitrate | 30 |
| Sodium alginate | 220 |

The ingredients are mixed together and compressed into tablets in the usual manner.

EXAMPLE 6

One thousand tablets are prepared from the following types and amounts of ingredients:

| | Gm. |
|---|---|
| Thiolated gelatin (12–13—SH/$10^5$ gm.) | 75 |
| Cupric sulfate, anhydrous | 1.0 |
| Terra alba | 25 |
| Acetylsalicylic acid | 324 |
| Sodium chloride | 50 |
| Cellulose acetate phthalate | 100 |
| Styrene maleic acid copolymer | 150 |

The ingredients are mixed together and compressed into tablets in the usual manner.

EXAMPLE 7

One thousand tablets are prepared from the following types and amounts of ingredients:

| | Gm. |
|---|---|
| Thiolated gelatin (12–13—SH/$10^5$ gm.) | 150 |
| Terra alba | 150 |
| Ferric chloride | 7.74 |
| Acetylsalicylic acid | 324 |
| Irradiated polyoxyethylene | 50 |

The ingredients are mixed together and compressed into tablets in the usual manner.

EXAMPLE 8

One thousand tablets are prepared from the following types and amounts of ingredients:

| | Gm. |
|---|---|
| Thiolated gelatin (12–13—SH/$10^5$ gm.) | 30 |
| Lactose | 65 |
| Cupric sulfate, anhydrous | 0.5 |
| Acetylsalicylic acid | 333 |
| Potassium bicarbonate | 50 |
| Pectin | 150 |

The ingredients are mixed and compressed into tablets in the usual manner.

EXAMPLE 9

One thousand tablets are prepared from the following types and amounts of ingredients:

| | Gm. |
|---|---|
| Thiolated gelatin (12–13—SH/$10^5$ gm.) | 50 |
| Cupric sulfate, anhydrous | 0.5 |
| Methscopolamine bromide | 2 |
| Potassium chloride | 80 |

The ingredients are mixed together and compressed into tablets in the usual manner.

EXAMPLE 10

One thousand tablets are prepared from the following types and amounts of ingredients:

| | Gm. |
|---|---|
| Thiolated gelatin (12–13—SH/$10^5$ gm.) | 90 |
| Tribasic sodium phosphate | 40 |
| Aluminum hydroxide gel | 470 |
| Alginic acid | 100 |
| Carboxypolymethylene | 50 |

The ingredients are mixed together and compressed into tablets in the usual manner.

EXAMPLE 11

One thousand tablets are prepared from the following types and amounts of ingredients:

| | Gm. |
|---|---|
| Thiolated gelatin (12–13—SH/$10^5$ gm.) | 150 |
| Magnesium oxide | 30 |
| Magnesium carbonate | 60 |
| Calcium carbonate | 360 |
| Cupric sulfate, anhydrous | 2 |
| Sodium carboxylmethylcellulose | 30 |

The ingredients are mixed together and compressed into tablets in the usual manner.

The foregoing tablets prepared according to Examples 9, 10 and 11 are useful in the treatment of ulcers in adult humans at a dose of one tablet taken orally every six hours. The tablets have the advantage of remaining in the stomach holding the medicinal material in the stomach for an extended length of time.

EXAMPLE 12

One thousand tablets are prepared from the following types and amounts of ingredients:

| | Gm. |
|---|---|
| Thiolated gelatin (12–13—SH/$10^5$ gm.) | 100 |
| Tribasic sodium phosphate | 20 |
| Cupric sulfate, anhydrous | 4 |
| Barium sulfate | 300 |
| Sodium chloride | 100 |
| Polyvinylpyrrolidone | 175 |

The ingredients are mixed together and compressed into tablets in the usual manner.

The tablets are useful in the study (by means of X-ray) of stomach retention time, the disintegration characteristics and passage of the tablets within the G–I tract.

EXAMPLE 13

One thousand capsules are prepared from the following types and amounts of ingredients:

| | Gm. |
|---|---|
| Thiolated gelatin (12–13 —SH/$10^5$ gm.) | 300 |
| Tribasic sodium phosphate | 10 |
| Cupric sulfate, anhydrous | 4 |
| Tetracycline hydrochloride | 250 |
| Locust bean gum | 100 |
| Tragacanth | 50 |

The ingredients are mixed together and filled into capsules.

EXAMPLE 14

One thousand capsules are prepared from the following types and amounts of ingredients:

| | Gm. |
|---|---|
| Thiolated gelatin (12–13 —SH/$10^5$ gm.) | 450 |
| Tribasic sodium phosphate | 10 |
| Cupric sulfate, anhydrous | 4 |
| Thiamine hydrochloride | 10 |
| Sodium chloride | 25 |

The powdered ingredients are mixed together, slugged, broken into granules by forcing through a 10 mesh screen and filled into capsules.

The foregoing capsules advantageously provide for a more efficient absorption of the thiamine hydrochloride.

EXAMPLE 15

One thousand suppositories are prepared from the following types and amounts of ingredients:

| | Gm. |
|---|---|
| Thiolated gelatin (12–13 —SH/$10^5$ gm.) | 2500 |
| Cupric sulfate | 9 |
| Phenyl mercuric nitrate | 1 |
| Tribasic sodium phosphate | 10 |
| Poloxalkol | 480 |
| Sodium sulfate | 100 |
| Carboxypolymethylene | 100 |

The ingredients are mixed together and compressed into 3 gram conical shaped suppositories.

The suppositories are useful in the treatment of trichomonal and mixed vaginitis by insertion of 1 suppository twice daily.

EXAMPLE 16

One thousand suppositories for rectal insertion are prepared from the following types and amounts of ingredients:

| | Gm. |
|---|---|
| Thiolated gelatin (12–13 —SH/$10^5$ gm.) | 2500 |
| Ferric chloride | 10 |
| Tetracycline hydrochloride | 100 |
| Belladonna extract | 15 |
| Ephedrine sulfate | 5 |
| Hydrocortisone acetate | 10 |
| Poloxalkol | 310 |
| Sodium chloride | 500 |

The ingredients are mixed together and compressed into 3 gram conical shaped suppositories.

The foregoing suppositories are useful in the treatment of internal hemorrhoids and proctitis by insertion of 1 suppository twice daily.

EXAMPLE 17

Following the procedure of the preceding Examples 1 through 16, inclusive, dry solid medicinal dosage forms are similarly prepared substituting an equal amount of a thiolated gelatin having an average of from 3.5 to 30 —SH groups per 100,000 grams for the thiolated gelatin of the example having from 12 to 13 —SH groups per 100,000 grams.

What is claimed is:

1. A dry solid medicinal dosage form which is a subcutaneous implant, a suppository for rectal or vaginal use, or an oral dosage form and which when an oral form is small enough to be swallowed and swells to a size too large to pass through the pylorus, consisting essentially of from about 5 to about 90% of the reaction product of gelatin with N-acetyl-homocysteine thiolactone having an average molecular weight of from 10,000 to 500,000 and having an average of from about 3.5 to about 30 —SH equivalents per 100,000 grams; from about 0.1 to about 20% of a pharmacologically acceptable accelerating agent effective to increase the rate of the cross-linking of the thiol groups of thiolated gelatin, provided that a pharmacologically innocuous amount of the particular agent chosen is used; an effective dosage unit quantity of a medicinal agent; from about 5 to about 70% of a non-digestible hydrophilic colloid effective to cause swelling of the dosage form to a larger size, and from about 8 to about 60% of a water soluble salt of a pharmacologically acceptable mineral acid having a cation selected from the group consisting of alkali metal and ammonium ions effective to hasten swelling.

2. A dry solid medicinal dosage form which is a subcutaneous implant, a suppository for rectal or vaginal use, or an oral dosage form and which when an oral form is small enough to be swallowed and swells to a size too large to pass through the pylorus, consisting essentially of from about 5 to about 90% of the reaction product of gelatin with N-acetyl-homocysteine thiolactone having an average molecular weight of from 10,000 to 500,000 and having an average of from about 3.5 to about 30 —SH equivalents per 100,000 grams; from about 0.1 to about 20% of a pharmacologically acceptable accelerating agent effective to increase the rate of the cross-linking of the thiol groups of thiolated gelatin, provided that a pharmacologically innocuous amount of the particular agent chosen is used; an effective dosage unit quantity of a medicinal agent; and a member selected from the group consisting of (a) from about 5 to about 75% of a non-digestible hydrophilic colloid effective to cause swelling of the dosage form to a larger size, and (b) from about 8 to about 60% of a water soluble salt of a pharmacologically acceptable mineral acid having a cation selected from the group consisting of alkali metal and ammonium ions effective to hasten swelling.

3. The dosage form of claim 2 wherein the member selected is from about 5 to about 75% of a non-digestible hyprophilic colloid effective to hasten swelling.

4. The dosage form of claim 2 wherein the member selected is from about 8 to about 60% of a water soluble salt of a pharmacologically acceptable mineral acid having a cation selected from the group consisting of alkali metal and ammonium ions effective to hasten swelling.

References Cited

UNITED STATES PATENTS

| | | | |
|---|---|---|---|
| 2,816,854 | 12/1957 | Gross | 424—143X |
| 2,946,722 | 7/1960 | Hoffman et al. | 424—143X |
| 3,028,308 | 4/1962 | Zambito et al. | 260—117X |
| 3,056,724 | 10/1962 | Marston | 424—22 |
| 3,089,828 | 5/1963 | Tsuk | 260—117X |
| 3,124,459 | 3/1964 | Erwin | 424—143X |
| 3,171,831 | 3/1965 | Town | 260—117 |
| 3,198,781 | 8/1965 | Benesch et al. | 260—117 |
| 3,247,066 | 4/1966 | Milosovich | 424—21 |
| 3,329,574 | 7/1967 | Barron et al. | 260—117X |
| 3,444,290 | 5/1969 | Wai | 424—4 |

FOREIGN PATENTS 936,386    9/1963    Great Britain.

SHEP K. ROSE, Primary Examiner

U.S. Cl. X.R.

424—19, 37, 360